United States Patent
Graves

(10) Patent No.: US 6,454,173 B2
(45) Date of Patent: Sep. 24, 2002

(54) SMART CARD TECHNOLOGY

(76) Inventor: Marcel A. Graves, c/o 115 Highway #8, Unit 202, Stoney Creek, Ontario (CA), L8G 1C1

(*) Notice: Subject to any disclaimer, the term of this patent is extended or adjusted under 35 U.S.C. 154(b) by 0 days.

(21) Appl. No.: 09/867,496

(22) Filed: May 31, 2001

Related U.S. Application Data

(60) Provisional application No. 60/224,904, filed on Aug. 14, 2000.

(51) Int. Cl.[7] .................................................. G06K 19/06
(52) U.S. Cl. ......................................... 235/492; 235/382
(58) Field of Search ................................... 235/492, 382

(56) References Cited

U.S. PATENT DOCUMENTS 4,992,651 A * 2/1991 Takahira ...................... 235/492

FOREIGN PATENT DOCUMENTS

FR  2503423  * 10/1982

* cited by examiner

*Primary Examiner*—Harold I. Pitts

(57) ABSTRACT

The present invention an electronic card for use in a secure data interchange system having a terminal adapted to receive and communicate with said electronic card, said card having means for communicating with said terminal and having a memory for storing program algorithms and data therein including valid terminal verification data and valid user identification request data; said electronic card comprising:

(a) a microprocessor for monitoring for a predetermined period of time, immediately following insertion of said card in said terminal, an output from said terminal for a terminal verification message and being operable to erase said memory when said terminal verification message is not received within said predetermined period of time and being responsive to said terminal verification message received within said predetermined period of time, by comparing said received terminal verification message to said stored valid terminal verification message and being operable to erase said memory when said received terminal verification message is not valid; and means for monitoring, following receipt of a valid terminal verification message, the output from said terminal for a user identification request and being responsive to said user identification request by comparing said received user identification request to said stored valid user identification request and being operable to erase said memory when said user identification request is not valid and being operable to erase said memory when said received request is an attempt to read data from said memory before receipt of said valid user identification request.

(b) said electronic card further storing the majority of application algorithms in the e-squared portion of the integrated circuit thereby providing a dynamic set up structure such that said card can be dynamically programmed for each unique application.

18 Claims, 3 Drawing Sheets

SMART CARD TECHNOLOGY

This application claims the benefit of provisional application 60/224,904 filed Aug. 14, 2000.

FIELD OF THE INVENTION

This invention relates generally to a system and method of providing information and services to a population of persons through portable devices which can be used to access any of a number of terminals to make use of the services offered at the said terminals. The system and method in particular provide for security against unauthorized access. The invention has use in the fields of automatic banking, automatic credit and debit transactions, passport and travel visa verification, health and medical records, security access, licensing and any other like field where fraud may pose a problem.

BACKGROUND OF THE INVENTION

Data transfer systems using portable devices such as cards with some memory capability, for example, a magnetic strip, and terminals to which the portable devices can be connected are well known. Generally they are used to control access to some area or service. Usually the terminals are connected to a central processing unit or computer which controls access and is the ultimate storage facility for the information on the card.

British Patent 1504196 to Moreno describes such a prior art system comprised of a portable device and a peripheral device or terminal which is connected to a central computer. Many of the portable devices referred to as prior art in Moreno used magnetic track memories which could easily be modified or the contents read. Also the memory storage capacity was quite low and the memory was susceptible of accidental modification. This left such systems vulnerable to abuse from fraudulent intervention.

U.S. Pat. No. 3,702,464 addressed the problem of lack of memory capacity and volatility by disclosing a portable device containing an integrated circuit memory. The device still suffered from the problem that the memory could be read and the contents extracted or changed. Moreno advanced the art by adding inhibiting means to prevent the transfer of data out of or into prohibited areas of the memory of the portable device. Preferably the portable device contained its own inhibiting means but the inhibiting means could be contained in the peripheral device.

In British Patent 1505715 to Moreno there is disclosed a system for interchanging information which is like those described above, but without the error prone direct connections from the peripheral devices connected to the central computer. The peripheral devices contained a write mechanism which could transfer the information from the portable device to the peripheral device devices would then be collected on some regular basis and taken to the central computer where the information would be transferred to the central computer's memory.

Canadian Patent 1207460 to Ugon discloses a method and apparatus for authorizing access to a service offered by an authorizing entity. The system comprises a portable card with memory and a microprocessor, and an authorizing entity system capable of communicating with the card and also performing computer program operations. The card and the system have the same algorithm to be executed and each has secret data upon which the algorithms operate to produce a result which can be compared to ensure that proper access is granted. This system is rather complicated and involves an operator at the authorizing entity end.

It is also known to encode a fingerprint on a portable card to verify the identity of the user. UK Patent Application GB 2185937 A of O'Shea et al discloses a credit or similar card which incorporates a computer generated image of the fingerprint of the authorized user. When a transaction is to be verified the user's finger print is scanned by a finger print reader and the result is compared with the information on the card. The user is authorized to have access if the prints match. Such devices are presently commercially available.

The systems described above suffer from the problem of complexity or they are susceptible to fraudulent and unauthorized access and tampering with the information in the card or the terminal. The present invention provides an apparatus and method for providing a highly secure and highly fraud proof system for providing access to services of an authorizing entity.

SUMMARY OF THE INVENTION

The invention provides an improvement over previous systems and methods of authorizing access to services in a card-terminal environment by providing for a system of protection and authorization which makes the system highly fraud-proof. The system is comprised of a portable device such as a card, a peripheral device such as a terminal, and optionally, a remote host computer in the case of large systems, although it can be seen that the host computer is not necessary for an operational system. These components are connected via some communication medium such as electrical connectors or optics or radio transmission. The terminal contains a microprocessor or some such logic device and memory, a card reading device and a finger print scanner. The card contains a microprocessor or some such logic device and memory, which can be connected to the terminal via electronic or some other means such as optics or radio transmission. The card and terminal each have their own data and programs. Upon insertion of the card into the reader a process of verification is carried out by means of the microprocessors or logic units, the programs and data in the memories. The card verifies that the terminal is valid, the terminal verifies that the card is valid and the user is verified by means of a finger print scan and comparison with finger print data previously recorded in the card. This is not to say that some other form of physical characteristic could not be used such as retinal or DNA scan. Where data is being transmitted between components of the system encoding and decoding is used to further enhance the security of the system.

The invention comprises a system for the interchange of information comprising at least one portable electronic device; at least one terminal device; communication means connecting the portable device with the terminal device; the portable device containing verification means to verify that the terminal device is a valid one; the terminal device containing verification means to verify that the portable device is a valid one and further verification means to verify that the user is authorized to use the system; protection means to prevent tampering with a terminal and encryption means to encode and decode data at the interfaces between the portable device and the terminal device.

The invention also consists of a method of preventing unauthorized access to a system comprised of a plurality of portable devices, a plurality of terminal devices and a communication link connecting the said terminal devices to a central host computer wherein the said portable device contains information identifying the said portable device as well as the authorized user, when the said terminal is connected to the said portable device and power is supplied to the said portable device the terminal device queries the portable device to determine if it is a valid portable device, if not the portable device is retained or rejected by the terminal, in turn the portable device queries the terminal to determine if the terminal is a valid terminal, if not the portable device erases its memory and becomes harmless, the terminal in turn scans a physical characteristic of the user and compares that information with stored information on the portable device to determine if that user is authorized to use the portable device and the terminal, if the portable device and terminal are valid and the user is authorized access is allowed to the service, if not the card is retained or rejected; when the power to the terminal is interrupted the terminal programs and data are lost and can only be reloaded by authorized personnel with their access portable devices or from the host computer; encryption is used at the portable device and terminal interface as well as at the terminal and host computer interface. Preferably said electronic card further stores the majority of application algorithms in the e-squared portion of the integrated circuit thereby providing a dynamic set up structure such that said card can be dynamically programmed for each unique application.

BRIEF DESCRIPTION OF THE DRAWINGS

The invention will now be described by way of example only, with references to the following drawings in which.

In drawings which illustrate embodiments of the inventions.

DETAILED DESCRIPTION OF THE PREFERRED EMBODIMENT

It should be apparent to persons skilled in the arts that various modifications and adaptation of this structure described above are possible without departure from the spirit of the invention the scope of which defined in the appended claim.

Figure 1:
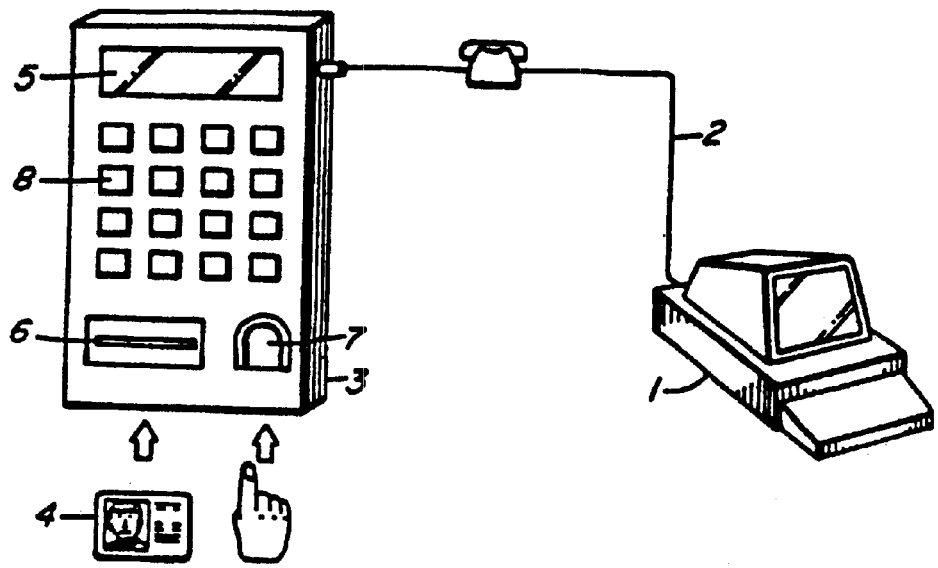
FIG. 1 is a pictorial representation of the basic system components, including an optional host computer.

The combining of the capability of an intelligent card co-operating with an intelligent terminal, a finger print scanning device, and optionally interfacing with a host computer to ensure maximum possible protection for a card user and a card issuer, is very desirable. In FIG. 1 the basic hardware configuration needed to implement such an idea is set out in pictorial form. The host computer system 1 can be a personal computer, mini-computer, mainframe or any suitable computer configuration depending upon the particular application. The host computer system is connected to terminal 3 by suitable linkages such as a telephone line through a modem. It is also possible to utilize other linkages such as radio transmission, or direct cable or optics. Terminal 3 is described as an intelligent terminal and comprises an output device such as a display 5, or a voice synthesizer or other means of communication with the user, a card reader 6 for reading or writing information from or to the card 4. It also contains an input device 8 such as a keyboard or other means of inputting information to the terminal and a finger print scanning device 7 or some other device to obtain physical information about the user.

When a user wishes to utilize a card to gain access to a service from a terminal, the system requires a unique verification procedure to be implemented. Upon insertion of the card into the terminal, the terminal itself is verified by the card. The card is then verified by the terminal and then the user's finger print which has been digitized into the card at the time of issue is compared with the finger print which is submitted via the finger print scanning device at the time of use. Additional user identification such as a personal identification number can also be included.

If the terminal into which the card is inserted is not a valid terminal the card will erase its memory rendering itself useless to any would-be unauthorized user.

An invalid card will be retained by the terminal and retrieved by authorized personnel. If the finger prints don't match the card is retained, otherwise access is granted to the service offered by the terminal.

Figure 2:
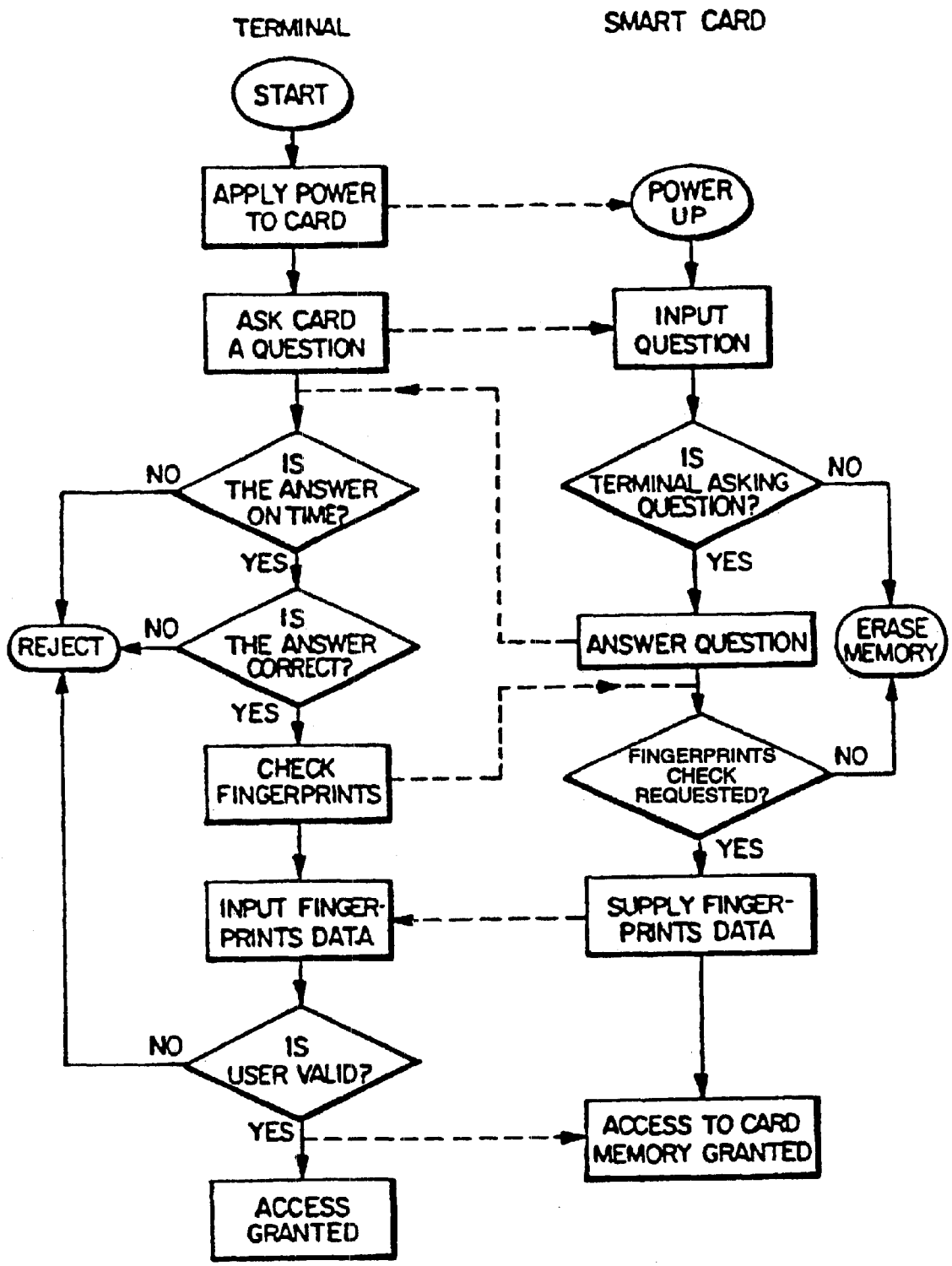
FIG. 2 is a flow chart depicting the dialogue between the card and the terminal.

FIG. 2 is a detailed flow chart depicting the above sequence of verification. In the preferred embodiment the card is an "intelligent card" with its own microprocessor or logic unit, memory, data and programs. In the preferred embodiment it is envisaged that the card will not carry its own power supply but will be connected to the terminal's power supply when the card is inserted. However, it may be preferable in some cases for the card to have its own power supply.

The whole process will start with the card's insertion into the terminal reader.

The verification process, then, shall start on the terminal side by generating a terminal verification message or question directed to the card. On the card side, the checkout is accomplished by simply waiting for a certain period of time for the terminal's question. If the question does not arrive, the card will destroy all information in its memory and become useless.

If one assumes that the card and the terminal are the correct ones, the parallel processing of the input question must proceed on both the terminal and card sides. On the terminal side, the checking of the card is achieved similarly to the card's check by waiting for the card verification message or answer for a certain period of time. If the answer does not arrive, the terminal can withhold the card or reject it. If the answer does arrive it will process it.

The invention can be configured to use different types of cards for different applications. For example:

1) Passport cards
2) Credit cards
3) Security access cards
4) Licence cards
5) Debit cards Different types of cards would produce different answers to the initial question. This would be the way the terminal recognizes the type of card it is dealing with. If the answer from the card arrives on time, the terminal would sort the answer to the proper application and proceed by checking if the answer is correct. In the negative case, it would, again, withhold or reject the card.

The next stage is the verification process in which identity of the card user is verified. This is done through a process of finger print checkout, in which the terminal transmits a user identification instruction message to the card. The person's finger prints are scanned and compared with the template received from that stored on the card. Again, if any attempt is made to read the data from the card memory before the finger print verification process is completed, the card will destroy its data.

The card will only allow access to its memory after confirmation from the terminal that the user is permitted to use it.

It is unlikely that the whole verification process will take any longer than approximately 25 seconds although the timing is not critical.

It is possible that someone could try to gain access to the data or the software itself by tampering with the terminal. To prevent this, all terminal software could be placed on RAM memory only. This way it would be lost immediately if the power to the terminal is disrupted. Only a licensed technician with his own access portable device would be able to down load new software either from his portable device or from the host computer, and bring the terminal up again.

Figure 3:
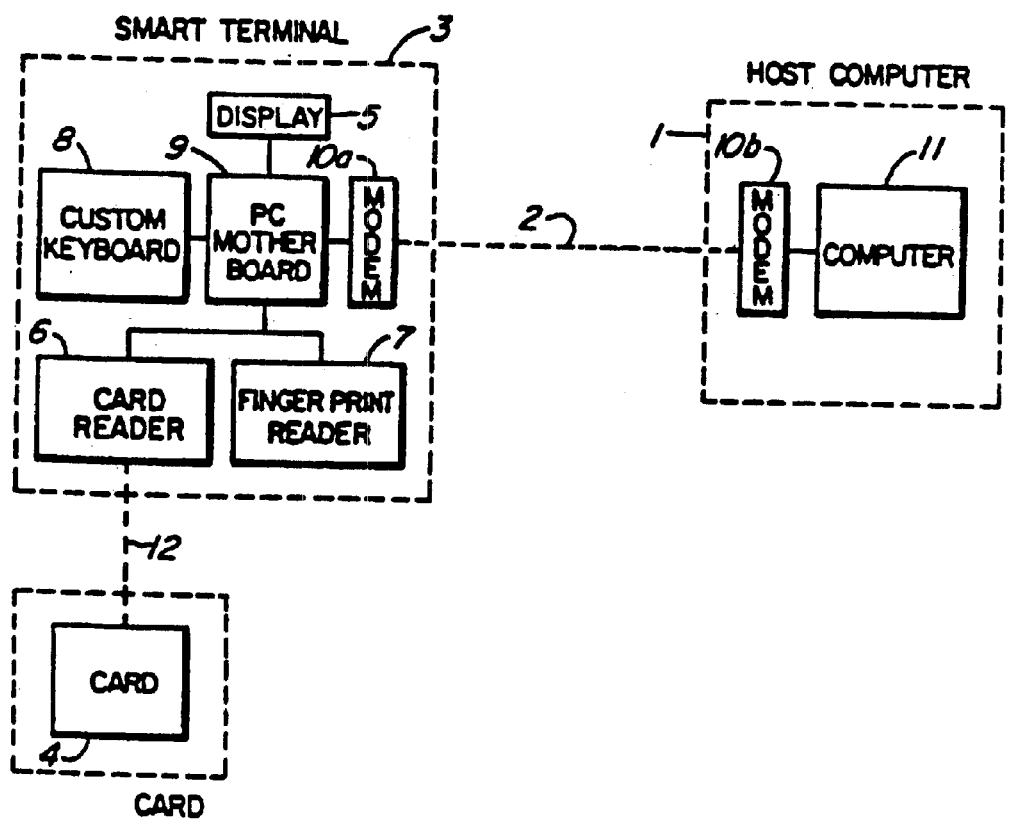
FIG. 3 is a block diagram illustrating hardware configuration.

The block diagram of FIG. 3 shows the hardware configuration of a preferred embodiment of a simple system comprised of only one terminal. The host computer system 1 is remotely located from the terminal 3. The two are connected by way of a telephone line 2 and modems 10a and 10b. The terminal 3 is composed of a PC-type motherboard 9, which includes a microprocessor or other logic device and memory, an "intelligent card" reader 6, a finger print scanner 7, a custom keyboard 8 and a display 5. The card reader 6 is adapted to receive and communicate with the "intelligent card" 4. The "intelligent card" typically contains a microprocessor or some other logic device and memory. Appropriate software and data are stored in the terminal 3 and in the "intelligent card" 4 to enable the verification procedures represented by the flow chart of FIG. 2 to be carried out. "Intelligent cards" are a unique technology utilizing plastic or some other media in which to embed microprocessor or some such logic unit and memory chips. The cards accordingly have both memory and processing capabilities. Essentially they are pocket sized computer systems with a wide range of application possibilities.

A number of off-the-shelf items can be used in the system. The terminal could use an IBM PC.TM. motherboard, a Toshiba.TM.FZ1318 card reader and an IDENTIX Touchsave.TM. T5-500 finger print scanner. The "intelligent card" could be a Toshiba TOSMART.TM. CZ-3000. Typically an IBM PC.TM. could be used as the host computer but larger more complex systems using many terminals may require a larger computer such as a mainframe.

Interconnections other than telephone lines and modems are possible. For example a security system for a building may have dedicated communication cables connecting the various terminals to the host computer without the use of modems. Also radio and optical interconnections are possible.

Finally to further enhance security an encryption technique could be used to encode data before transmitting between the host computer and the terminal, and decoding upon receipt. Similarly encoding and decoding could be used when reading and writing from and to the "intelligent card".

Presently Preferred Embodiment

Figure 4:
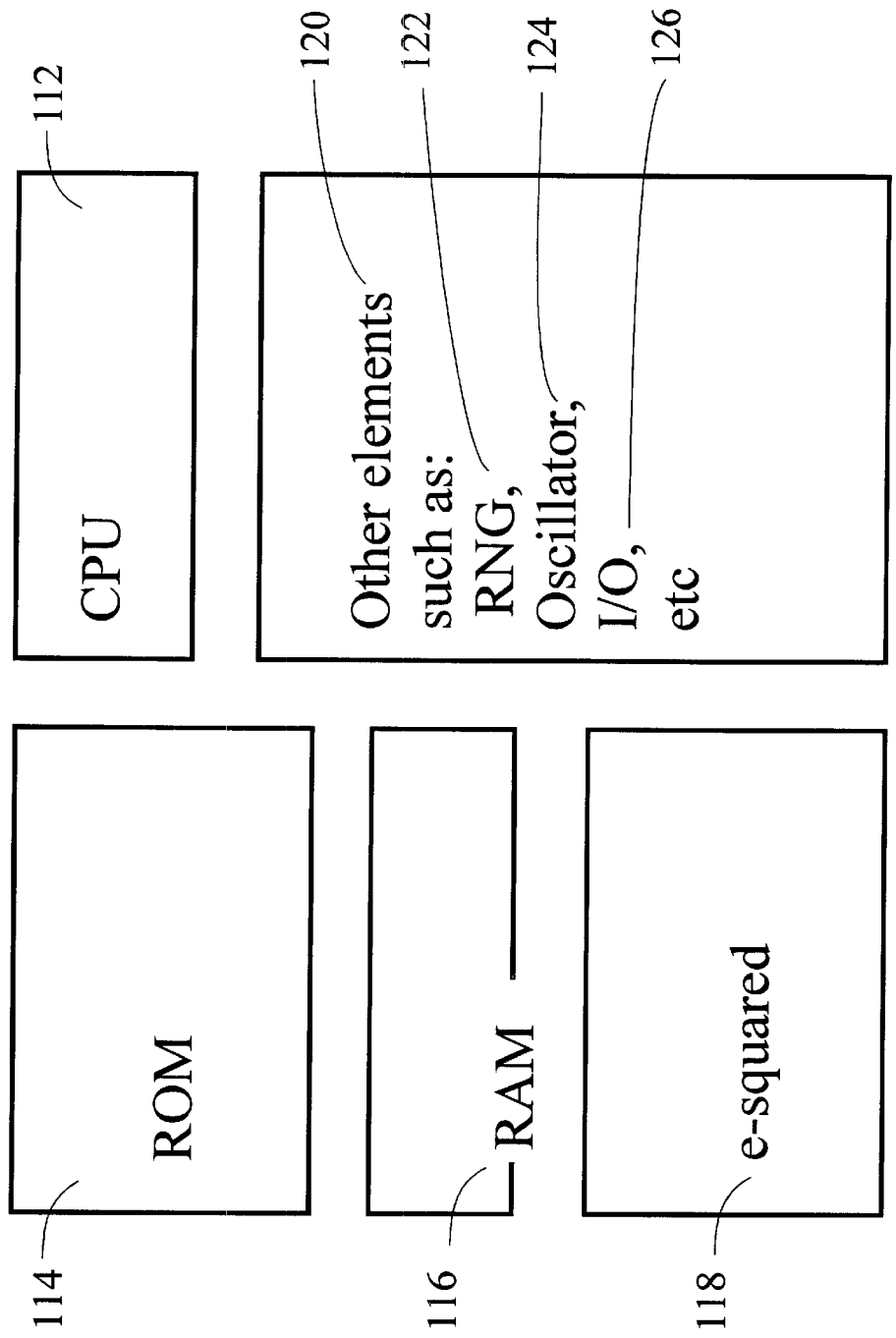
FIG. 4 is a block diagram of a typical IC structure.

Referring now to FIG. 4 a schematic diagram of a typical integrated circuit (IC) structure which may be found in an intelligent or smart card. Included with a typical integrated circuit are:

A Central Processing Unit; CPU 112

Read Only Memory namely ROM 114

Random Access Memory namely RAM 116

Electronically Erasable Programmable Read Only Memory EEPROM namely e-squared 118 Other elements 120, including random number generator 122, Oscillator 124, and input/output components 126.

In the present art the problem with Smart Card Technology is that the typical IC structure requires that the ROM masque be re-written every time to accommodate changes or new applications. The current art places the instructions (also known as application algorithms) for a particular application, be it a passport card, credit card, a security access card, license card, or debit card, onto the ROM 114 section of the IC structure. The application instructions are placed into the ROM 114 since this is a more secure location on the IC and it is more difficult for would be hackers to invade the ROM portion of the IC rather than EEPROM or the e-squared 118 section. The problem with placing the application details onto the ROM 114 of the IC structure is that every time the application changes or there is an update or an improvement or errors are found in the application details a total new ROM masque must be created at a very high cost.

The current invention solves this problem through what is termed a dynamic set up structure that is soft coded into the e-squared 118 portion of a smart card. By placing the application algorithms into the e-squared 118 portion of the integrated structure, cards can be produced very quickly for a number of applications simply by reprogramming the e-squared 118 section of the integrated circuit rather than having to produce an entirely new ROM masque for each particular application or change that is made to the functioning of the card.

Currently placing the application details into the e-squared 118 section of the integrated circuit is considered a great security risk since this portion of the card is the easiest to invade and copy. Therefore presently the application details are placed into the ROM 114 structure described above.

With the advent of self-destruct features described in U.S. Pat. No. 5,239,166 and herein as well, it now becomes possible to utilize the EEPROM or e-squared 118 section of the IC structure in order to store the application algorithms into a secure fashion onto the integrated circuit.

In addition, by utilizing a larger EEPROM or e-squared 118 section of the integrated circuit, chips can be designed and built with a far smaller ROM 114 allocation. The application algorithms can now be placed in the e-squared 118 section rather than the ROM 114 section, therefore, the ROM 114 section need not be near as large as the current convention. By way of example on power up of a smart card, the card asks if a legitimate terminal is attempting to access its data. If a failed response from the terminal attempting access occurs (usually within a certain time limitation), the card destructs itself by writing zero into all of its registers thereby rendering the card blank. As a result would be copiers cannot duplicate the card because they are unable to determine what needs to be duplicated since it has been erased by the time they attempt to make a duplication.

Another of advantage of placing the instruction set and/or the application algorithms onto the e-squared 118 portion of the IC structure is that if small changes are required in the application rather than having to rewrite the ROM masque completely, one is able to reprogram existing cards. In other words, it is possible to make changes dynamically thereby increasing the longevity and usefulness of a given set of cards and reduce the cost of correcting errors, making changes or adding additional features.

SUMMARY

Current Smart Card Technology requires the instruction set as per the application to reside primarily in the ROM 114.

This is usually done in an effort to provide some form of security for the application algorithms. With this invention certain algorithms still reside in the ROM, however the bulk of the application algorithms can now be stored in the e-squared 118 portion of the chip where future alterations to an existing application can be made providing it has been originally developed for the use of the dynamic set up structure as disclosed in this specification. The dynamic set up structure together with the self erase feature creates a smart card which is highly secure. Additionally less ROM is required as heretofore and dynamic programming of smart cards becomes possible without compromising security.

I claim:

1. An electronic card for use in a secure data interchange system having a terminal adapted to receive and communicate with said electronic card, said card having means for communicating with said terminal and having a memory for storing program algorithms and data therein including valid terminal verification data and valid user identification request data; said electronic card comprising:

(a) means for monitoring, for a predetermined period of time, immediately following insertion of said card in said terminal, an output from said terminal for a terminal verification message and being operable to erase said memory when said terminal verification message is not received within said predetermined period of time and being responsive to said terminal verification message received within said predetermined period of time, by comparing said received terminal verification message to said stored valid terminal verification message and being operable to erase said memory when said received terminal verification message is not valid; and means for monitoring, following receipt of a valid terminal verification message, the output from said terminal for a user identification request and being responsive to said user identification request by comparing said received user identification request to said stored valid user identification request and being operable to erase said memory when said user identification request is not valid and being operable to erase said memory when said received request is an attempt to read data from said memory before receipt of said valid user identification request;

(b) said electronic card further storing the majority of application algorithms in the e-squared portion of the integrated circuit thereby providing a dynamic set up structure such that said card can be dynamically programmed for each unique application.

2. A card as defined in claim 1, wherein each of said means for monitoring is a microprocessor.

3. A card as defined in claim 1 or 2, said memory including pre-stored information indicative of a predetermined user of said card and said means for monitoring, following receipt of a valid terminal verification message being operable to read said predetermined user information from said memory and being operable to transmit to said terminal said predetermined user information, upon receipt of said valid user identification request.

4. An electronic card for use in a secure data interchange system having a terminal adapted to receive and communicate with said electronic card, said card comprising:

(a) means for communicating with said terminal;
    memory for storing program algorithms and data therein including valid terminal verification data, valid user identification request data, and information indicative of a predetermined user of said card;
    means for monitoring, for a predetermined period of time, immediately following insertion of said card in said terminal, an output from said terminal for a terminal verification message and being operable to erase said memory when said terminal verification message is not received within said predetermined period of time and being responsive to said terminal verification message received within said predetermined period of time, by comparing said received terminal verification message to said stored valid terminal verification message and being operable to erase said memory when said received terminal verification message is not valid;
    means for monitoring, following receipt of a valid terminal verification message, the output from said terminal for a user identification request and being responsive to said user identification request by comparing said received user identification request to said store valid user identification request and being operable to erase said memory when said user identification request is not valid identification instruction message and being operable to erase said memory when said received request is an attempt to read data from said memory before receipt of said valid user identification request;
    each of said means for monitoring is a microprocessor; and
    said means for monitoring, following receipt of a valid terminal verification message, being operable to read said predetermined user information from said memory and being operable to transmit to said terminal said predetermined user information, upon receipt of said valid user identification request;

(b) said electronic card further storing the majority of application algorithms in the e-squared portion of the integrated circuit thereby providing a dynamic set up structure such that said card can be dynamically programmed for each unique application.

5. A card as defined in claim 4, said microprocessor including a computer program.

6. A card as defined in claim 4, said predetermined user information being indicative of a physical characteristic of an authorized user of the card.

7. A card as defined in claim 6, said physical characteristic is a computer generated image of a finger print pattern of said authorized user of said card.

8. A card as defined in claim 4, 5, 6, or 7, including means for receiving power, from said terminal, upon insertion of said card in said terminal.

9. A method for providing a secure electronic card for use in a data interchange system, wherein a terminal is adapted to receive and communicate with the electronic card and wherein said card has means for communicating with said terminal and a memory for storing data and program algorithms therein including valid terminal verification data and valid user identification request data, said method comprising:

monitoring by said card for a predetermined period of time, immediately following insertion of said card in said terminal, an output from said terminal for a terminal verification message;
    erasing said memory when said terminal verification message is not received within said predetermined period of time, and comparing said terminal verification message received within said predetermined period of time to said stored valid terminal verification message, and erasing said memory when said terminal verification message is not valid;
    monitoring by said card, following receipt of a valid terminal verification message, the output from said terminal for a user identification request from said terminal and comparing said received user identification request to said stored valid user identification request; and erasing said memory when said user identification request is not valid, and erasing said memory when said request is an attempt to read data from said memory before receipt of a valid user identification request;

storing the majority of application algorithms in the e-squared portion of the integrated circuit thereby providing a dynamic set up structure such that said card can be dynamically programmed for each unique application.

10. A method as defined in claim 9, including transmitting to said terminal a card verification message for verification of said card by said terminal, following receipt, within said predetermined period of time, of said valid terminal identification message.

11. A method as defined in claim 9, said card including information, pre-stored therein, indicative of a predetermined user of said card, said method including:

(a) reading said stored predetermined user information from said memory; and transmitting said predetermined user information to said terminal, upon receipt of a valid user identification request, for verification by said terminal of said user.

12. A system for the secure interchange of information comprising:

(a) at least one portable electronic card having a memory for storing program algorithms and data therein including valid terminal verification data and valid user identification request data;

at least one terminal device adapted to receive and communicate with said portable electronic card;

said card including:

means for communicating with said terminal;

means for monitoring, for a predetermined period of time, immediately following insertion of said card in said terminal, an output from said terminal for a terminal verification message and being operable to erase said memory when said terminal verification message is not received within said predetermined period of time, and being responsive to said terminal verification message received within said predetermined period of time, by comparing said received terminal verification message to said stored valid terminal verification message and being operable to erase said memory when said received terminal verification message is not valid; and means for monitoring, following receipt of a valid terminal verification message, the output from said terminal for a user identification request and being responsive to said user identification request by comparing said received user identification request to said stored valid user identification request and being operable to erase said memory when said user identification request is not valid and being operable to erase said memory when said received request is an attempt to read data from said memory before receipt of said valid user identification request;

(b) said electronic card further storing the majority of application algorithms in the e-squared portion of the integrated circuit thereby providing a dynamic set up structure such that said card can be dynamically programmed for each unique application.

13. A system as defined in claim 12, said terminal comprising:

terminal memory having a valid card verification message stored therein;

means for transmitting to said output said terminal verification message, upon insertion of said card in said terminal; means for monitoring, for a second predetermined period of time a card output for receipt of a card verification message and being operable to reject said card when said card verification message is not received within said second predetermined period of time, and being responsive to said card verification message received within said second predetermined period of time by comparing said received card verification message to a stored valid card verification message, and being operable to reject said card when said received card verification message is invalid;

means for reading a user identification from said user following receipt of a valid card verification message; and means for transmitting to said output a user identification request, and means for monitoring said card output for receipt of said predetermined user information and being responsive to said predetermined user information for comparing said received predetermined user information to said read user identification, and being operable to reject said card when said predetermined user information is invalid.

14. A system as defined in claim 13, said card including means for transmitting to said terminal, following receipt of valid terminal verification message, a card verification message.

15. A system as defined in claim 13, said means for reading is a scanning device for scanning a physical characteristic of said user.

16. A system as defined in claim 15, said physical characteristic is a finger print pattern.

17. A system as defined in claim 12, said card including means for transmitting to said terminal, following receipt of valid terminal verification message, a card verification message.

18. A system as defined in claim 12, 13 or 17, including protection means associated with said terminal to prevent tampering with said terminal and said protection means including a volatile memory which loses its contents when power is interrupted to said memory.

* * * * *